United States Patent [19]
Arndt

[11] Patent Number: 4,574,659
[45] Date of Patent: Mar. 11, 1986

[54] PRECISION DRIVE FOR POSITIONING SOLAR ENERGY APPARATUS

[75] Inventor: Heinrich Arndt, Augsburg, Fed. Rep. of Germany

[73] Assignee: Zahnraderfabrik Renk, A.G., Augsburg, Fed. Rep. of Germany

[21] Appl. No.: 405,551

[22] Filed: Aug. 5, 1982

[30] Foreign Application Priority Data

Aug. 10, 1981 [DE] Fed. Rep. of Germany ....... 3131612

[51] Int. Cl.$^4$ .................... F16H 1/28; F16H 37/06
[52] U.S. Cl. ................................. 74/804; 74/803; 74/665 L
[58] Field of Search .............. 74/803, 804, 805, 661, 74/665 L, 665 N, 750; 350/289; 353/3; 126/424

[56] References Cited

U.S. PATENT DOCUMENTS

| | | | |
|---|---|---|---|
| 2,434,082 | 1/1948 | Sharpe | 74/805 |
| 3,056,315 | 10/1962 | Mros | 74/805 |
| 3,214,999 | 4/1964 | Lapp | 74/805 |
| 3,320,828 | 5/1967 | Grant | 74/804 |
| 4,050,331 | 9/1977 | Braren | 74/804 |
| 4,383,520 | 5/1983 | Huebl | 74/665 |
| 4,386,540 | 6/1983 | Skaggs, Jr. | 74/805 |

FOREIGN PATENT DOCUMENTS

| | | | |
|---|---|---|---|
| 0071103 | 2/1983 | European Pat. Off. | 353/3 |
| 0098404 | 1/1984 | European Pat. Off. | 126/424 |
| 600469 | 7/1934 | Fed. Rep. of Germany | 74/804 |
| 1196805 | 3/1973 | Fed. Rep. of Germany | |
| 2618433 | 11/1976 | Fed. Rep. of Germany | |
| 2835973 | 12/1980 | Fed. Rep. of Germany | |
| 2930052 | 2/1981 | Fed. Rep. of Germany | |
| 0155944 | 12/1980 | Japan | 74/804 |

Primary Examiner—William F. Pate, III
Assistant Examiner—David Novais
Attorney, Agent, or Firm—Natter & Natter

[57] ABSTRACT

A precision drive for positioning azimuth and elevation angles of a solar energy collector apparatus includes a casing mounted for rotation about a vertical shaft. The casing carries a pair of motor driven gear trains. A primary stage reduction gearing of each train comprises a cyclo-gear or a harmonic drive, while the secondary stage includes a monoplanetary gear train having a planet gear mounted to an eccentric carrier. The planet gear teeth simultaneously engage a fixed ring gear and a rotatable ring gear. The output of the primary stage drives the carrier, and the rotatable ring gear provides output rotation. One gear train engages a pinion fixed to the vertical shaft for rotating the casing about the shaft, while the rotatable ring gear of the other gear train engages a horizontal shaft for adjustment of the elevation angle.

3 Claims, 9 Drawing Figures

PRECISION DRIVE FOR POSITIONING SOLAR ENERGY APPARATUS

TECHNICAL FIELD

The invention relates generally to solar energy collection apparatus and more particularly to drive assemblies and gear trains for lockingly positioning such apparatus.

BACKGROUND ART

The demand for energy sources other than fossil fuels has led to extensive development of devices for utilization of solar energy. Among such solar energy devices have been various collector panels heating liquid carried in tubing, reflector panels, lenses and other radiant energy concentrators and devices for transforming solar radiation directly into electrical energy. Numerous problems have been encountered in the design of efficient solar energy collection apparatus. Some problems related to the positioning of the collection apparatus for maximum energy absorption. Because the angle of incidence of the sun varied during the day, solar energy collection devices had to be repositioned for efficacious operation.

With regard to positioning mechanisms, solar energy applications not only mandated a high degree of accuracy but also high rigidity so that collection panels could not move as a result of their own weight or wind loads. To obtain accurate angular positioning, high gear ratios were necessary, yet inertial mass was required to be minimized. Further, stability in the presence of extreme temperature and humidity environmental factors was required.

DISCLOSURE OF THE INVENTION

A positioning drive includes a casing mounted for rotation about a vertical shaft and a pair of gear trains carried in the casing. Each gear train includes primary stage gearing and secondary stage gearing coaxially positioned along an axis parallel to the shaft axis as is a driving motor. The primary stage gearing comprises a cyclo-gear or a harmonic drive while the secondary stage is a monoplanetary gear train. The primary stage drives a carrier of the secondary stage. The carrier includes an eccentric to which a planet gear is journalled. The teeth of the planet gear simultaneously engage both a stationary ring gear and a rotatable ring gear with both ring gears being of the same diameter. The rotatable ring gear drives a pinion which is in engagement with a spur gear fixed to the shaft to rotate the gear casing about the shaft and thus adjust the azimuth angle of the collection apparatus.

A horizontal axis positioning train is provided in the casing by an identical dual stage gear train oriented about a horizontal axis parallel to the axis of a horizontal shaft. An arm extends between the solar collection apparatus and the horizontal shaft, and the position of the horizontal shaft determines the elevation angle of the solar apparatus.

From the foregoing compendium, it will be seen that it is a feature of the present invention to provide a positioning drive of the general character described adapted for solar energy apparatus.

A further feature of the present invention is to provide a stable gear train of the general character described for positioning a solar energy apparatus which provides a high transmission ratio while occupying but a modicum of space.

Another feature of the present invention is to provide a gear train of the general character described for positioning a solar energy apparatus which provides a high transmission ratio with but a few gears.

A further aspect of the present invention is to provide a positioning drive of the general character described for a solar energy apparatus drive which is insensitive to temperature fluctuations between $-30°$ C. ($-22°$ F.) and $+80°$ C. ($176°$ F.), as well as fluctuations of relative humidity between 15% and 100%.

A further aspect of the present invention is to provide a positioning drive of the general character described for a solar energy apparatus, which drive includes a high transmission ratio while being relatively low in mass to thereby provide reduced inertia.

Another feature of the present invention is to provide a positioning drive of the general character described for a solar energy apparatus, with reduced acceleration and impact moments as compared with parallel shaft gear trains of equal transmission ratios, thereby facilitating intermittent operation by a low power driving motor.

A further aspect of the present invention is to provide a positioning drive of the general character described, which drive is capable of reversible direction positioning.

Another feature of the present invention is to provide a positioning drive of the general character described for a solar energy apparatus, which drive is efficient in operation and economical to produce.

Another aspect of the present invention is to provide a gear train of the general character described for positioning a solar energy apparatus, which gear train is self locking in the presence of torque applied at its output end.

Other features and aspects of the present invention in part will be obvious and in part will be pointed out hereinafter.

With these ends in view, the invention finds embodiment in certain combinations of elements and arrangements of parts by which the features, aspects and attributes aforementioned and certain other features and aspects are hereinafter attained, all as more fully described with reference to the accompanying drawings and the scope of which is more particularly pointed out and indicated in the appended claims.

BRIEF DESCRIPTION OF THE DRAWINGS

In the accompanying drawings in which some of the various possible exemplary embodiments of the invention are shown.

BEST MODE FOR CARRYING OUT THE INVENTION

Figure 4:
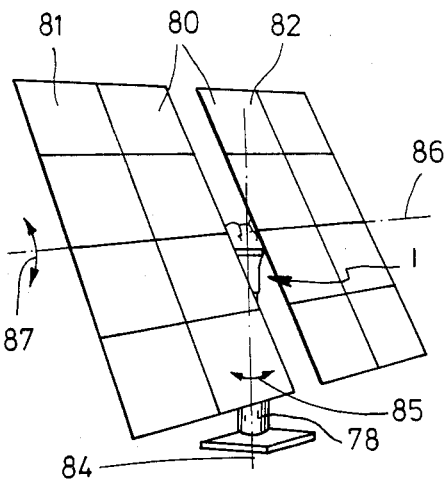
FIG. 4 is a reduced scale perspective illustration of the solar apparatus including a pair of reflector panels carried by a precision positioning drive constructed in accordance with the present invention.

Referring now in detail to the drawings, FIG. 4 illustrates a solar apparatus 80 schematically shown mounted to and positioned by a precision positioning drive 1 constructed in accordance with and embodying the present invention. By way of example, the solar apparatus 80 may comprise a pair of generally planar reflector assembly panels 81, 82. The panels 81, 82 are carried on a substantially vertical column 78 and are unitarily positionable about a vertical azimuth axis 84 in directions as shown by the heavy arrows 85. It should be noted that the azimuth axis 84 is coincident with the axis of the column 78. In addition, the panels 81, 82 are positionable about a horizontal axis 86 in directions as indicated by the heavy arrows 87.

In a typical application, a plurality of solar apparatus 80 having reflector panels may be grouped around a receiving tower and the precision drive associated with each apparatus 80 is controlled to track incident solar radiation and reflect such radiation upon a utilization apparatus at the receiving tower. The utilization apparatus may comprise an apparatus suitable for generating electricity, for example, and such apparatus does not form part of the present invention.

It should be understood, however, that the panels 81, 82 need not comprise reflector assemblies and the present invention is directed not to the panels per se but rather to a precision drive capable of positioning a solar collector apparatus.

As previosuly mentioned, the precision drive 1 includes a pair of motor driven composite gear trains comprising a vertical or azimuth axis gear train denoted generally by the reference numeral 3 and a horizontal axis gear train referred to generally by the reference numeral 203. The composite gear trains 3, 203 have a transmission ratio which is relatively high, e.g. 53. Each composite gear train includes a primary stage gearing 42, 242 which is driven by an electric motor and a secondary stage gearing which is driven by the output of the primary stage gearing.

Figure 1:
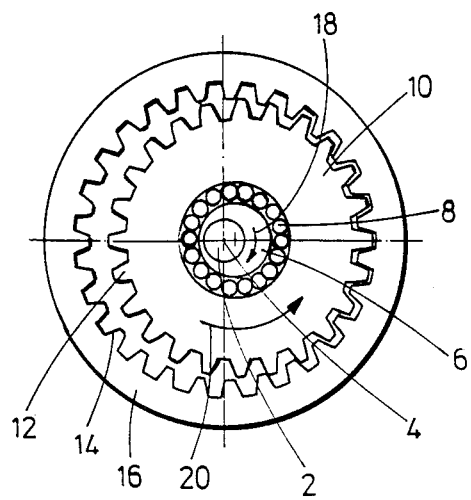
FIG. 1 is a schematic frontal view of a secondary stage gearing of a gear train drive for positioning a solar apparatus constructed in accordance with and embodying the present invention and showing a monoplanetary gear train.

In FIG. 1 the secondary stage gearing of the azimuth axis composite gear train 3 is illustrated. In accordance with the present invention, the secondary stage gearing comprises a positive gear train, i.e. a gear train which transmits motion only from the driving element to a driven element but not from the driven element to the driving element. In addition, the secondary stage gearing is capable of being driven in two directions of rotation and provides a high reduction ratio.

The ability of the secondary stage gearing to self lock in the presence of a torque applied at the driven end is due to an effective lever condition established in the gearing, is high rigidity and absence of lash.

The secondary stage gearing comprises a hybrid planetary gear train hereinafter referred to as a monoplanetary gear train. The monoplanetary gear train does not include a central sun gear but includes a central planet carrier 2 having an eccentric 6 offset with respect to an axis 4 common with the composite gear train 3. The eccentric 6 carries a journal bearing 8 for rotatably mounting a planet gear 10.

The diameter of the planet gear 10 is such that its external spur gearing 12 engages internal gearing 14 formed on a stationary ring gear 16. With the ring gear 16 fixed and an input driving the planet carrier 2 in a direction as shown by the heavy arrow 18, the planet gear 10 will rotate in an opposite direction as shown by the heavy arrow 20.

Figure 8:
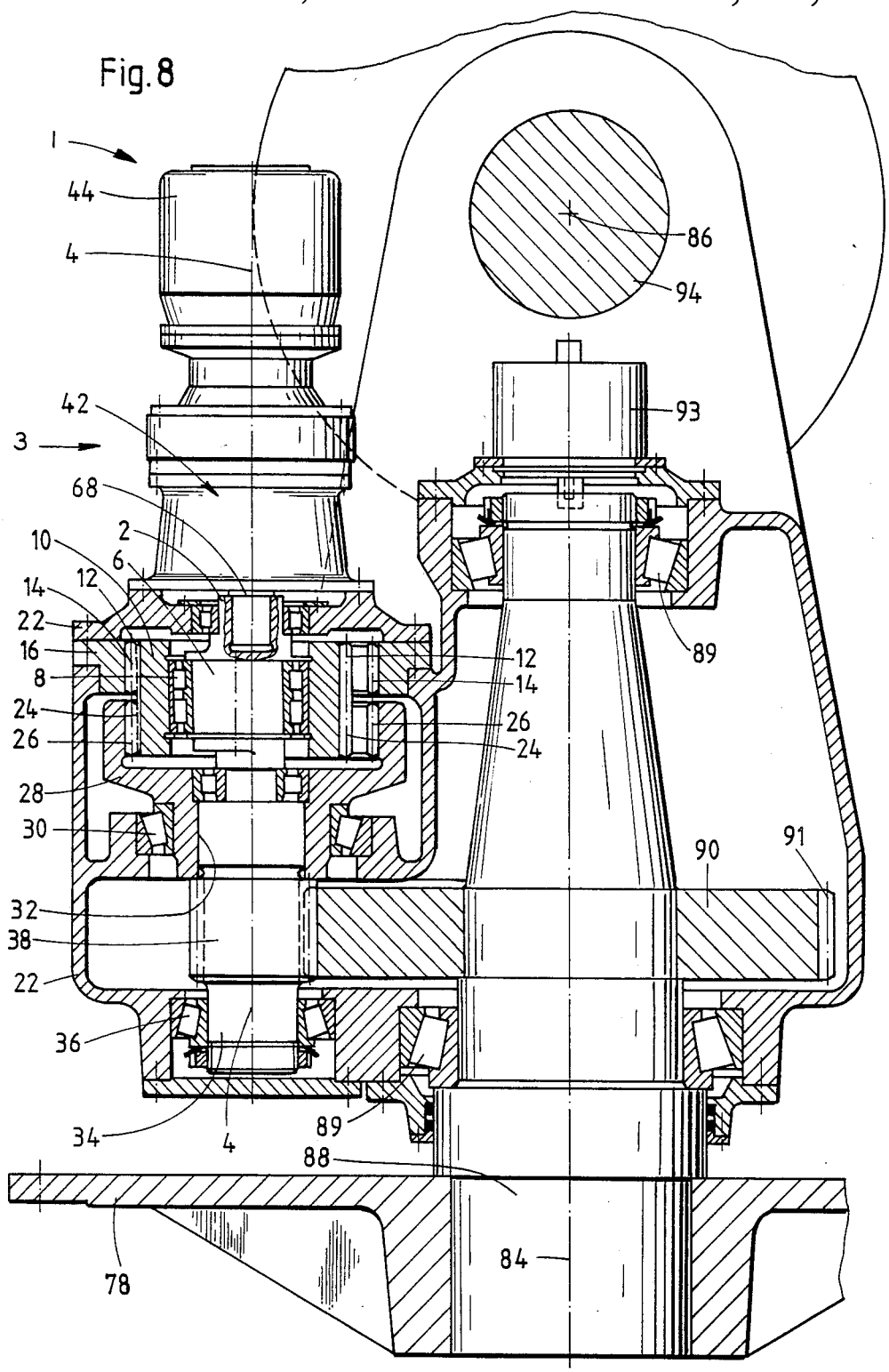
FIG. 8 is an enlarged scale sectional view through the positioning drive, the same being taken substantially along the line VIII—VIII of FIG. 7 and showing details of the secondary stage gearing for a gear train drive which positions the panels about an azimuth axis.

Additional details of the composite gear train 3 are illustrated in FIG. 8, to which attention is now directed. The precision positioning drive 1 includes a casing 22 within which the secondary stage gearing is housed. The ring gear 16 is fixed by being secured to the casing 22.

In addition to the spur gearing 12, the planet gear 10 includes a further spur gearing denoted by the reference numeral 24. The planet gear 10 may be constructed of two planet wheel halves disposed axially behind each other and rigidly connected. One of the planet wheel halves may carry the spur gearing 12 and the other, the spur gearing 24.

Each of the spur gearings 12, 24 may comprise a different number of teeth. In the embodiment illustrated in FIG. 8, however, a one piece planet gear 10 is provided and the gearings 12, 24 are formed as single teeth of continuous extended width.

The spur gearing 24 is in engagement with internal gearing 26 formed on a further rotatable ring gear 28. The ring gear 28 is mounted for rotation in the casing 22 through a roller bearing 30. A pinion shaft 34 is received within a bore of the ring gear 28 and nonrotationally secured by conventional methods, such as a shrink fit along mating surfaces 32. Mounting the pinion shaft 34 for rotation in the casing 22 coaxial with the axis 4 is a roller bearing 36. The ring gear 28 and the pinion shaft rotate unitarily, being carried by the bearings 30, 36.

As previously discussed, the planet wheel 10 rotates in a direction opposite to that of the planet carrier 2. If the internal gearing 14 of the ring gear 16 has a smaller number of teeth than the internal gearing 26 of the ring gear 28, the ring gear 28 will rotate in a direction opposite that of the planet gear 10. Thus, the ring gear 28 will rotate in the same direction as the planet carrier 2.

If the spur gearings 12, 24 which engage the ring gears 16, 28, respectively, have a different number of teeth, a stepdown transmission results. The internal transmission ratio of such stepdown transmission is calculated by the following formula:

$$i = \frac{Z24 \times Z14}{Z26 \times Z12}$$

In addition, the stepdown transmission ratio between the planet carrier 2 and the rotatable ring gear 28 is determined by the following formula $$iK = \frac{1}{1 - i}$$

wherein

Z14 denotes the number of teeth of the internal gearing 14 of the ring gear 16,

Z12 denotes the number of teeth of the spur gearing 12 of the planet gear 10 which engage the ring gear 16, Z26 denotes the number of teeth of the internal gearing 26 of the rotatable ring gear 28 and Z24 denotes the number of teeth of the spur gearing 24 of the planet wheel 10 which engage the rotatable ring gear 28.

Turning now to the driving components of the composite gear train 3, an electric motor 44, coaxial with the axis 4, drives a primary stage gear train 42. The primary stage gear train 42 and the motor 44 are mounted to the casing 22 by bolts or other conventional methods.

Figure 2:
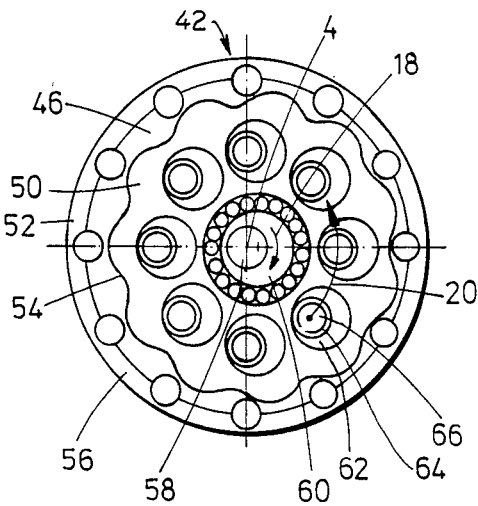
FIG. 2 is a schematic frontal view of a primary stage gearing of the gear train and illustrating a cyclo-gear.

The primary stage gearing 42 is preferably a highly reducing transmission and may be of the type known as a cyclo-gear which is denoted by the reference numeral 46 and is depicted in FIG. 2. The cyclo-gear 46 is similar to a planetary gear train and includes a planet wheel 50 which is of a diameter slightly less than the inside diameter of a ring wheel 52. In lieu of involute toothed gearing, the planet wheel 50 includes a closed cycloid peripheral train 54 and the ring wheel 52 includes a roller rim 56.

The planet wheel 50 is carried on a planet carrier 58 which includes an eccentric 60 about which the planet wheel is rotatably mounted through a roller bearing. If the motor 44 drives the planet carrier 58 in the direction shown by the heavy arrow 18, the planet wheel 50 will rotate in an opposite direction as illustrated by the heavy arrow 20.

To transmit the rotation of the planet wheel 50 to the input of the secondary stage gearing, the planet wheel 50 includes a plurality of enlarged bores 62 equidistantly spaced from the axis 4 and from each other. Positioned within each bore 62 is a roller 64, each of which engages and rolls on a separate bolt or pin 66 of a driven shaft 68. The driven shaft 68 is visible in FIG. 8 and is shown drivingly secured to the planet carrier 2 of the secondary stage gearing.

Figure 3:
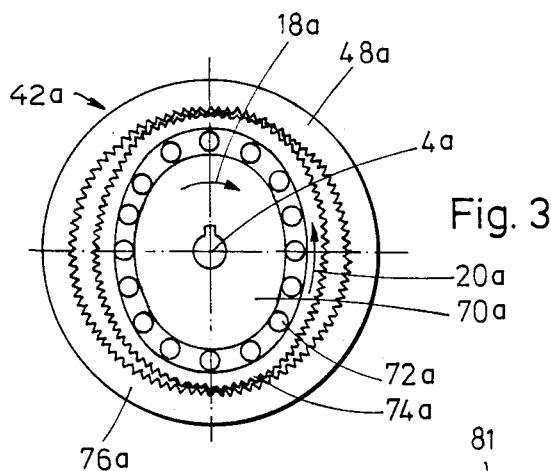
FIG. 3 is a schematic frontal view of an alternate embodiment of the invention wherein the primary stage gearing comprises a haromonic drive.

An alternate embodiment primary stage gearing 42a is depicted in FIG. 3. In this embodiment like numerals denote like components as the prior embodiment, bearing the suffix "a" however. In the embodiment of FIG. 3, a harmonic drive 48a is employed in lieu of a cyclogear train 46 for providing a highly reducing transmission ratio between the motor 44 and the secondary stage gearing.

The harmonic drive 48a includes an elliptical planet carrier 70a which is driven by the motor 44. The elliptical carrier 70a includes a peripheral bearing 72a and an externally toothed flexible steel gear 74a in contact with the bearing 72a. The flexible steel gear 74a is continuously deformed when the planet carrier 70a rotates. Its external toothing engages diametrically opposed tooth surfaces of internal toothing of a ring gear 76a. It should be noted that the ring gear 76a is nondeformable and preferably fixed against rotation.

The number of teeth of the flexible steel gear 74a differs from the number of teeth of the ring gear 76a, for example, by two teeth. As the planet carrier 70a rotates, it squeezes the teeth of the flexible steel gear 74a to mesh with the rigid teeth of the ring gear 76a.

With the ring gear 76a fixed, the flexible gear 74a will rotate in a direction opposite that of the planet carrier 70a as shown by the heavy arrows 20a and 18a. The flexible gear 74a will be deformed at the speed of the planet carrier 70a, however it will rotate in accordance with a reduction ratio determined by the number of teeth of the gear 74a and the ring gear 76a. The stepdown or reduction ratio may be predetermined in accordance with the following formula $$i = \frac{Nf}{Nf - Nc}$$

wherein

Nf denotes the number of teeth of the flexible steel gear 74a and

Nc denotes the number of teeth of the ring gear 76a.

Both the cyclo-gear 46 and the harmonic drive gear 48a have the advantages of high transmission ratio, small flank clearance, high efficiency, lightness in weight, reversibility in direction of rotation, and small overall length. The cyclo-gear and the harmonic drive are not, however, self locking in the presence of a torque applied at their driven ends. They do not have the high rigidity and absence of play of the second stage gearing. As a result, the second stage gearing is, as seen from the motor 44, the last transmission stage except, however, for the final connection between the secondary stage gearing and the driven component which shall now be described in greater detail.

With reference now to FIG. 8, it was previously mentioned that the pinion shaft 34 was rigidly secured to the rotatable ring gear 28. The pinion shaft includes a pinion 38, preferably in one piece with the shaft 34 and positioned between the second ring gear 28 and the bearing 36. The pinion 38 engages spur gearing teeth 91 of a gear 90 which is mounted to a fixed azimuth shaft 88. The azimuth shaft 88 projects upwardly from the supporting column 78 which carries the reflector assembly panels 81, 82. The casing 22 is rotationally mounted to the azimuth shaft 88 through a pair of roller bearings 89 one of which engages a concentric sleeve formed on the azimuth shaft 88 beneath the spur gear 90. The second roller bearing 89 is seated within a well formed in an upper surface of the casing 22 and engages a reduced diameter cylindrical surface of the shaft 88 adjacent its end.

It will be appreciated that the toothed engagement between the pinion 38 and the spur gear 90 will cause the casing 22 together with the composite gear trains 3, 203 and the reflector panel assemblies 81, 82 carried by the casing 22 to unitarily rotate about the azimuth axis 84 when the motor 44 runs. Since all gearings of the composite gear train 3 have spur cut teeth, axial forces are not generated during force transmission.

Figure 9:
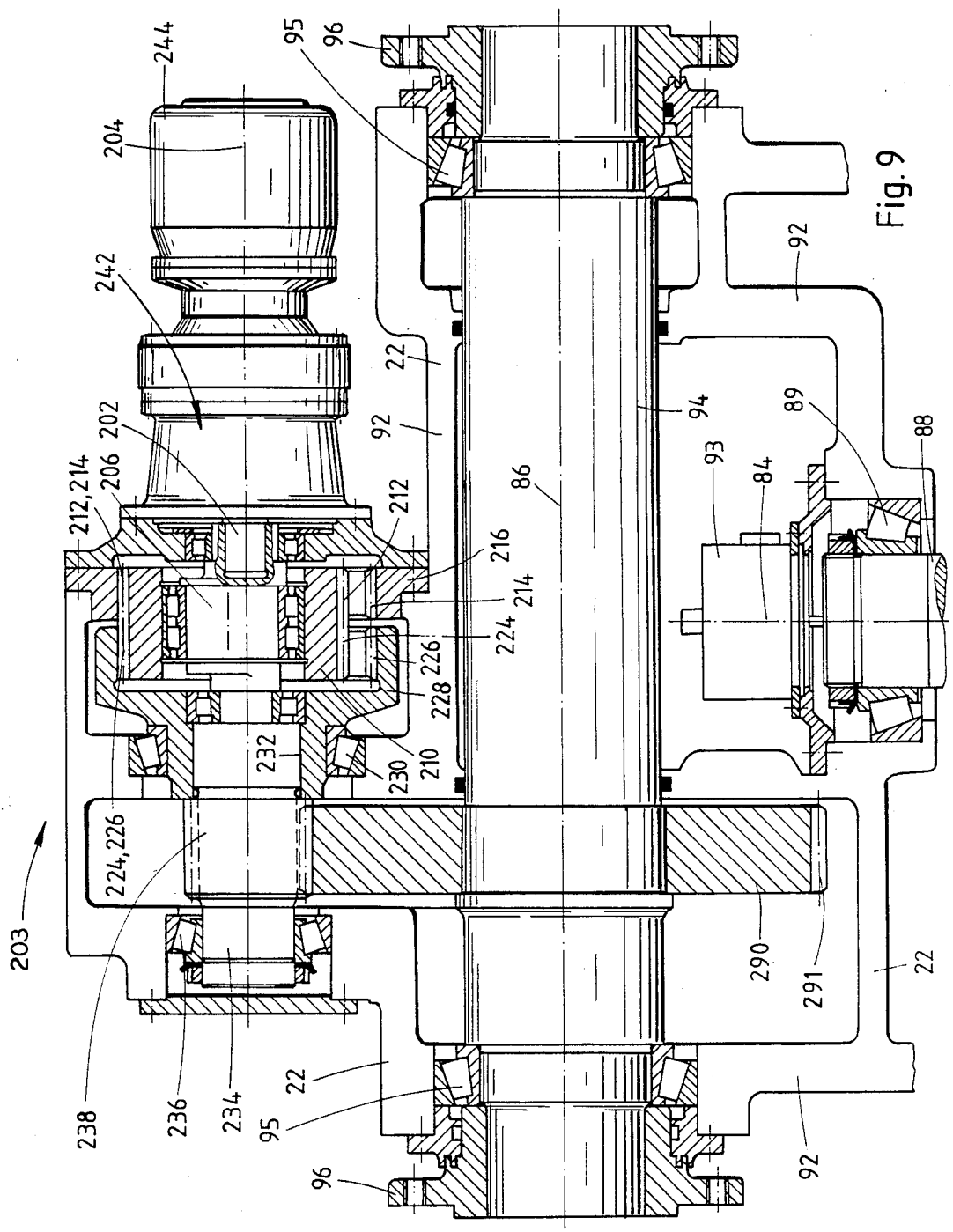
FIG. 9 is an enlarged scale sectional view through the positioning drive, the same being taken substantially along the line IX—IX of FIG. 6 and showing details of the secondary stage gearing of a gear train drive for positioning the panels about a horizontal axis.

Illustrated in FIGS. 8 and 9 is an electronic control device 93 for controlling the operation of the motors for each of the gear trains 3, 203. The control device 93 may be mounted to the casing 22 above and coaxially with the azimuth shaft 88. Also illustrated in FIGS. 8 and 9 is a horizontal shaft 94 which extends perpendicular to the azimuth axis and is journalled for rotation within the casing 22 by a pair of bearings 95. It will be seen that the horizontal shaft 94 is positioned above the control device 93.

Figure 5:
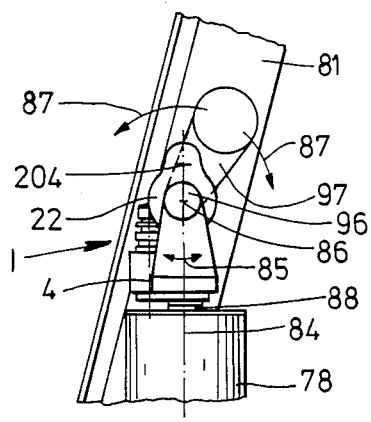
FIG. 5 is an enlarged scale auxiliary side elevation view of the solar apparatus and the positioning drive with one of the reflector panels removed for clarity.

The ends of the horizontal shaft 94 project from the sides of the casing 22 and are provided with radial flanges 96 to which are attached crank arms 97 (illustrated in FIG. 5) which carry the reflector assembly panels 81, 82.

The reflector assembly panels 81, 82 are adjustably positioned along the horizontal axis 86, coincident with the axis of the horizontal shaft 94. The composite gear train 203 is provided to adjustably vary the angular position of the horizontal shaft 94 and lock the shaft in its adjusted position.

Figure 6:
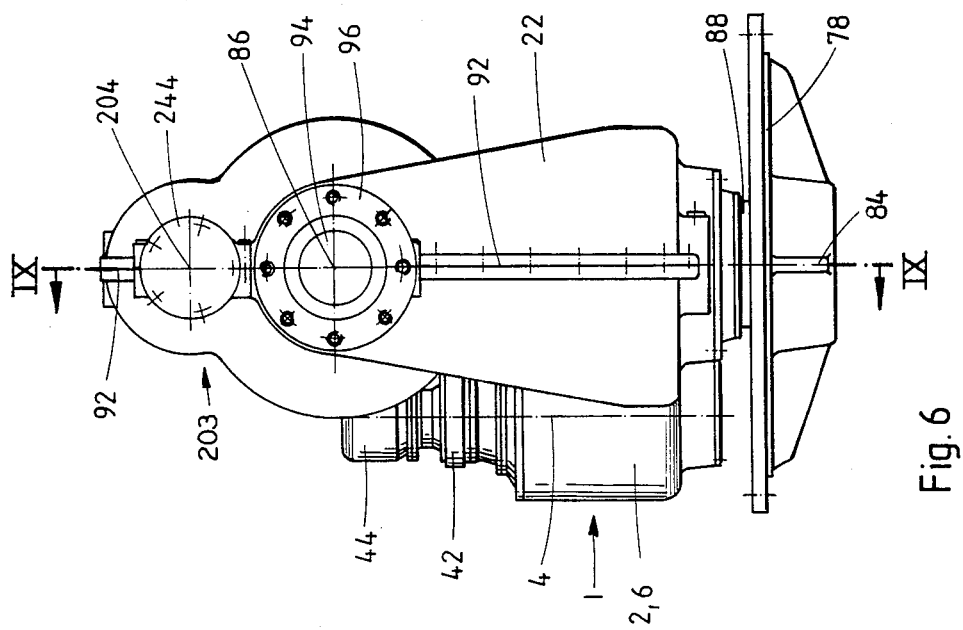
FIG. 6 is an elevation view of the positioning drive similar to the view of FIG. 5 but on an enlarged scale and without showing reflector panels.
Figure 7:
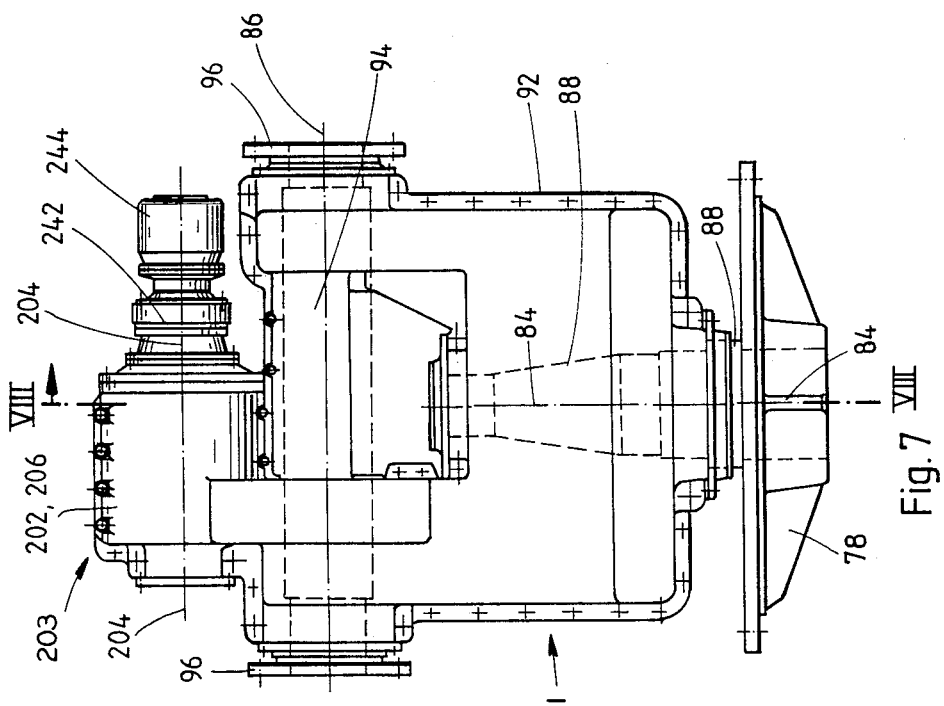
FIG. 7 is a further elevational view of the positioning drive taken perpendicular to the view of FIG. 6.

The composite gear train 203 is substantially identical to the composite gear train 3 previously described in detail and lies within a plane 92 (FIG. 6) which joins two shell halves of the casing 22 along a flange. The plane 92 extends through the azimuth axis 84. To facilitate comparison of the various components in the drawings, the same reference numerals are employed for corresponding components of each gear train, however with respect to the horizontal axis gear train such reference numerals have been increased by a value of 200.

Referring again to FIG. 9, it will be seen that the horizontal shaft 94 includes a spur gear 290 nonrotationally secured thereto and having gearing teeth 91. The spur gear 290 is of the same design as the driven spur gear 90 of the azimuth shaft 88. The driven spur gear 290 is in engagement with a driven pinion 238 of the composite gear train 203 which is disposed above the horizontal shaft 94. It will be observed from FIG. 9 that an axis 204 of the composite gear train 203 lies parallel to and above the axis 86 of the horizontal shaft 94.

The composite gear train 203 includes a secondary stage gearing having a planet carrier 202, an eccentric 206, a planet gear 210, as well as two ring gears 216, 228 disposed about a horizontal axis 204.

A primary stage gearing 242 having a high reducing transmission and a driving motor 244 drives the secondary stage gearing.

Both composite gear trains 3, 203 are commonly housed in the gear casing 22. The reflector assembly panels 81, 82 are positionable about two positioning axes, the azimuth axis 84 and the elevation axis 86 into any desired angular position.

Thus, it will be seen that there is provided a precision drive for positioning solar energy apparatus which achieves the various features and aspects of the invention and which is well suited to meet the conditions of practical usage.

As various modifications might be made in the invention as above set forth, it is to be understood that all matter herein described or shown in the accompanying drawings is to be interpreted as illustrative and not in a limiting sense.

Having thus described the invention, there is claimed as new and desired to be secured by Letters Patent:

1. A pair of precision drive trains drivable in opposite directions of rotation for positioning a solar energy collection apparatus by angular adjustment of such apparatus along a pair of perpendicular positioning axes, each drive train including electric motor means, a high transmission ratio primary stage gearing, the electric motor means drivingly engaging the primary stage gearing, the primary stage gearing comprising a harmonic drive, and a secondary stage gear train, the gear train comprising a monoplanetary gear being free of a sun gear and including a planet carrier, the harmonic drive being in driving engagement with the planet carrier, a planet gear, means rotatably mounting the planet gear to the planet carrier about an axis eccentric to the axis of the carrier, the carrier axis being parallel to the respective positioning axis associated with each drive train, an internal ring gear coaxial with the carrier axis, means fixing the ring gear against rotation, the planet gear including gearing means for engagement with the fixed ring gear, a further internal ring gear coaxial with the carrier axis and axially juxtaposed with the fixed ring gear, the further ring gear having a different number of teeth than the fixed ring gear, the planet gearing means comprising a pair of axially contiguous spur gear means, the contiguous spur gear means comprising parts of the same wide gear teeth, one of the spur gear means being in engagement with the fixed ring gear and the other spur gear means being in engagement with the further ring gear, rotation of the planet carrier causing rotation of the planet gear and rotation of the planet gear drivingly rotating the further ring gear by engagement of the planet gear gearing means with the further ring gear, the further ring gear comprising a driven element of the gear train, the planet gear, the spur gear means and the ring gears comprising precision machined gearings assembled for operation with the absence of lash, the secondary stage gear train being self locking in the presence of externally applied torque at the driven element, each gear train further including a pinion, means nonrotationally joining the pinion and the further ring gear, a spur gear, the pinion being in driving engagement with the spur gear, each spur gear being disposed coaxially to the respective positioning axis of each drive train, a casing, the casing carrying both drive trains, the fixed ring gear being fixed relative to the casing, the drive trains further including means for rotatably mounting the casing about one positioning axis and means drivingly interconnecting one drive train with the one positioning axis for rotation of the casing about the one positioning axis by operation of the one drive train, the other drive train further including means drivingly interconnecting the spur gear associated therewith and a driven part, and means mounting the driven part within the casing for rotation about the other positioning axis, the casing comprising two halves joined along a plane extending through the one positioning axis, the driven part coaxial with the other positioning axis being mounted substantially within the casing dividing plane.

2. A precision positioning drive constructed in accordance with claim 1 wherein the one positioning axis comprises an azimuth axis and the other positioning axis comprises an elevation axis, the driven part of the other positioning axis comprising shaft means for adjustment of elevation angles, means for attachment of solar energy collection apparatus to be adjusted, the attachment means being secured to opposite ends of the shaft means, the driven part being nonrotationally connected to the shaft means.

3. A precision positioning drive for a solar energy collection apparatus constructed in accordance with claim 1 further including a substantially vertical fixed azimuth shaft, the one positioning axis extending coaxial with the axis of the azimuth shaft.

* * * * *